US012812370B2

(12) United States Patent
Looi et al.

(10) Patent No.: US 12,812,370 B2
(45) Date of Patent: Nov. 24, 2026

(54) SECURED APPLICATION-TO-PERSON SMS MESSAGING

(71) Applicant: ANAM TECHNOLOGIES LTD., Dublin (IE)

(72) Inventors: Kwok Onn Looi, Bander Puteri (MY); Martin Cahill, Carbury (IE)

(73) Assignee: ANAM TECHNOLOGIES LTD., Dublin (IE)

( * ) Notice: Subject to any disclaimer, the term of this patent is extended or adjusted under 35 U.S.C. 154(b) by 31 days.

(21) Appl. No.: 18/994,339

(22) PCT Filed: Jul. 20, 2023

(86) PCT No.: PCT/EP2023/070202
§ 371 (c)(1),
(2) Date: Jan. 14, 2025

(87) PCT Pub. No.: WO2024/018023
PCT Pub. Date: Jan. 25, 2024

(65) Prior Publication Data

US 2026/0089496 A1 Mar. 26, 2026

(30) Foreign Application Priority Data

Jul. 22, 2022 (EP) .................................... 22186458

(51) Int. Cl.
*H04L 29/06* (2006.01)
*H04W 4/14* (2009.01)
(Continued)

(52) U.S. Cl.
CPC ........... *H04W 12/033* (2021.01); *H04W 4/14* (2013.01); *H04W 12/0431* (2021.01);
(Continued)

(58) Field of Classification Search
None
See application file for complete search history.

(56) References Cited

U.S. PATENT DOCUMENTS 7,296,156 B2 11/2007 Marmigere et al.
11,102,646 B1 * 8/2021 Indurkar ............... H04W 12/35
(Continued)

FOREIGN PATENT DOCUMENTS

EP 1782650 B1 10/2009

OTHER PUBLICATIONS

Saxena, Neetesh; Chaudhari, Narendra S. EasySMS: A Protocol for End-to-End Secure Transmission of SMS. IEEE Transactions on Information Forensics and Security, vol. 9, Issue: 7. https://ieeexplore.ieee.org/stamp/stamp.jsp?tp=&arnumber=6807699 (Year: 2014).*
(Continued)

*Primary Examiner* — Jeremiah L Avery
(74) *Attorney, Agent, or Firm* — Bookoff McAndrews, PLLC

(57) ABSTRACT

The present invention relates to a method for secure Application-to-Person, A2P, short messaging service, SMS, communication at a network node. The method comprises receiving an A2P SMS from an A2P sender for delivery to a subscriber and determining that the A2P SMS requires secure A2P SMS delivery to the subscriber. The method also comprises encrypting a payload of the A2P SMS using at least one pre-shared key, PSK, and an encryption algorithm, wherein the at least one PSK and the encryption algorithm have been securely provided to a SIM associated with the subscriber. The method further comprises encoding the encrypted A2P SMS payload to obtain an encoded A2P SMS payload and relaying the encoded A2P SMS payload to the SIM. A method for communication at a subscriber device comprising a SIM associated with a subscriber.

20 Claims, 7 Drawing Sheets

(51) Int. Cl.
*H04W 12/033* (2021.01)
*H04W 12/0431* (2021.01)
*H04W 12/069* (2021.01)
*H04W 12/128* (2021.01)
*H04W 12/72* (2021.01)

(52) U.S. Cl.
CPC ....... *H04W 12/069* (2021.01); *H04W 12/128* (2021.01); *H04W 12/72* (2021.01)

(56) References Cited

U.S. PATENT DOCUMENTS

| | | | | |
|---|---|---|---|---|
| 11,423,385 | B2 * | 8/2022 | Ibasco | H04L 9/3234 |
| 11,516,676 | B1 * | 11/2022 | Holmes | H04W 12/72 |
| 11,811,845 | B2 * | 11/2023 | Decenzo | H04L 12/2809 |
| 2012/0072979 | A1 * | 3/2012 | Cha | H04W 12/069 726/8 |
| 2014/0073289 | A1 * | 3/2014 | Velasco | H04W 12/04 455/411 |
| 2014/0079219 | A1 * | 3/2014 | Yigit | H04W 12/033 380/270 |
| 2016/0226828 | A1 * | 8/2016 | Bone | G06F 13/1689 |
| 2017/0346851 | A1 * | 11/2017 | Drake | H04L 9/0838 |
| 2018/0288582 | A1 * | 10/2018 | Buckley | H04W 12/06 |
| 2018/0359811 | A1 * | 12/2018 | Verzun | H04L 12/28 |
| 2019/0013967 | A1 * | 1/2019 | Ishii | H04L 12/4633 |
| 2020/0029215 | A1 * | 1/2020 | Mardikar | H04W 12/06 |
| 2020/0389469 | A1 * | 12/2020 | Litichever | H04L 12/18 |
| 2021/0160683 | A1 * | 5/2021 | Li | H04W 12/72 |
| 2022/0046413 | A1 | 2/2022 | Nowak | |
| 2022/0104007 | A1 * | 3/2022 | Bai | H04W 8/22 |
| 2022/0210642 | A1 * | 6/2022 | Slovetskiy | H04W 12/068 |
| 2022/0224521 | A1 * | 7/2022 | Borisoglebski | H04L 9/0825 |
| 2022/0232387 | A1 * | 7/2022 | Nitsch | H04W 12/04 |
| 2022/0278867 | A1 * | 9/2022 | Lee | H04L 12/282 |
| 2022/0303779 | A1 * | 9/2022 | Boyapalle | G06F 21/575 |
| 2022/0345371 | A1 * | 10/2022 | Blakey | H04L 41/12 |
| 2023/0007483 | A1 * | 1/2023 | Mueck | H04W 12/069 |

OTHER PUBLICATIONS

Thomas, Minta; V, Panchami. An encryption protocol for end-to-end secure transmission of SMS. 2015 International Conference on Circuits, Power and Computing Technologies [ICCPCT-2015]. https://ieeexplore.ieee.org/stamp/stamp.jsp?tp=&arnumber=7159471 (Year: 2015).*

Hossain, Md. Asif et al. A proposal for enhancing the security system of short message service in GSM. 2008 2nd International Conference on Anti-counterfeiting, Security and Identification. https://ieeexplore.ieee.org/stamp/stamp.jsp?tp=&arnumber=4688386 (Year: 2008).*

Ok, Kerem et al. Design of a key exchange protocol between SIM card and service provider. 015 23rd Telecommunications Forum Telfor (TELFOR). https://ieeexplore.ieee.org/stamp/stamp.jsp?tp=&arnumber=7377465 (Year: 2015).*

International Search Report and Written Opinion issued Sep. 22, 2023 for International Application No. PCT/EP2023/070202 (17 pages).

* cited by examiner

SECURED APPLICATION-TO-PERSON SMS MESSAGING

FIELD OF THE INVENTION

The present invention relates to secure delivery of Short Messaging Service (SMS) or text messages, and in particular, to preventing fraud that may arise from interception of Application-to-Person (A2P) SMS messages that are being delivered from a mobile network to a mobile subscriber.

BACKGROUND TO THE INVENTION

Methods for intercepting voice calls and SMS messages have been known for some time, and have been exploited by fraudsters, resulting in banking fraud cases. SMS messages may be vulnerable to interception when delivered by a mobile network to mobile subscribers due to the lack of secured A2P SMS delivery where the delivered SMS is not encrypted. This has allowed fraudsters to decipher intercepted SMS messages that may have contained a one-time-password (OTP) or mobile Transaction Number (mTAN), thereby allowing them to complete unauthorised financial transactions.

One means of avoiding such interception is by way of SMS encryption, which is supported in the SMS specifications. Prior to the advent of smartphones, SMS mobile banking used specialised applications on a Subscriber Identity Module (SIM) or SIM card, known as SIM Toolkit (STK). Such SMS-based banking transactions were secured with end-to-end encryption between the bank and the STK on the subscriber's SIM card in their mobile phone. However, this solution was cumbersome, since the banks, the mobile operators and the SIM card vendors were required to work together. This solution was also specific to the particular bank and was therefore difficult to scale to cover the whole mobile subscriber base across multiple banks and mobile operators. More recently, smartphones have become the most popular medium for mobile banking and ecommerce. Smartphone-based mobile banking typically requires use of a dedicated smartphone application and internet access. However, many of these modern banking and ecommerce services use SMS for two-factor authentication (2FA), and so the lack of secured A2P SMS remains a significant concern.

It is desirable to provide a solution that overcomes at least some of the disadvantages associated with existing arrangements. In particular, it is desirable to provide a solution that does not require use of a smartphone, dedicated smartphone applications, or internet access, but can be widely supported on all mobile phones, including feature phones. It is also desirable that such a solution should be scalable and widely deployable by leveraging existing SMS specifications and infrastructure.

SUMMARY OF THE INVENTION

According to an aspect of the present invention, there is provided a method for secure A2P SMS communication at a network node, comprising:

- receiving an A2P SMS from an A2P sender for delivery to a subscriber;
- determining that the A2P SMS requires secure A2P SMS delivery to the subscriber;
- encrypting a payload of the A2P SMS using at least one pre-shared key (PSK) and an encryption algorithm, wherein the at least one PSK and the encryption algorithm have been securely provided to a Subscriber Identity Module (SIM) associated with the subscriber;
- encoding the encrypted A2P SMS payload to obtain an encoded A2P SMS payload;
- relaying the encoded A2P SMS payload to the sim.

The network node may be an SMS firewall. In other embodiments, the method of the present invention may be carried out at a network node within a Mobile Network Operator (MNO) network.

The SIM may be a SIM card for insertion in a subscriber device, such as a traditional physical SIM. However, the present disclosure is equally applicable to a SIM which is permanently integrated into the subscriber device, such as an eSIM or iSIM, and the term SIM as used herein is also intended to encompass such technologies.

The method may further comprise securely providing the at least one PSK and the encryption algorithm to the SIM associated with the subscriber, prior to receiving the A2P SMS from the A2P sender for delivery to the subscriber. This may take place, for example, during an onboarding process. Securely providing the at least one PSK and the encryption algorithm to the SIM associated with the subscriber may comprise delivering the at least one PSK and the encryption algorithm to the SIM associated with the subscriber using a secured SMS Over-the-Air (OTA) mechanism.

An advantage of this arrangement is that it is based on SMS as the bearer and the corresponding SMS OTA and SIM Toolkit specifications, such as those set out in GSM 23.048 "Security mechanisms for the (U) SIM application toolkit; Stage 2" and 3GPP 31.115 "Secured packet structure for (Universal) Subscriber Identity Module (U) SIM Toolkit applications" and 31.111 "Universal Subscriber Identity Module (USIM) Application Toolkit (USAT)". The existing SMS OTA mechanism has been widely deployed and proven for SIM-based security applications. The SMS OTA mechanism is inherently protected with encryption and used to securely communicate with the mobile subscriber's SIM when required. SMS OTA is typically delivered using an SMS command packet as specified in GSM 23.048/3GPP 31.115. The command packet allows the SMS OTA to be specified and encoded with or without encryption or ciphering enabled. Such encryption may be based on SIM keys (KIc, KID) which are known to an OTA gateway/server in the MNO, and provided with the SIM provisioning. Where the SMS OTA is delivered with the command packet with ciphering enabled based on the SIM keys, this is typically delivered via the MNO OTA gateway. This SMS OTA mechanism may be used to deliver the at least one PSK and the encryption algorithm to the SIM.

Relaying the encoded A2P SMS payload to the SIM may comprise delivering the encoded A2P SMS to the SIM using an SMS command packet without ciphering enabled. That is, ciphering of the SMS command packet may be disabled. Because ciphering is not enabled, the SIM keys are not used and so the SMS command packet does not need to be routed via the MNO OTA gateway. Rather the at least one PSK and encryption algorithm are used for encryption in place of the SIM keys and so the mechanism for relaying the A2P SMS to the SIM is independent of the MNO OTA gateway. The SMS command packet may be delivered from the network node, such as the SMS firewall, to a Short Message Service Centre (SMSC) and onward to the subscriber, or directly from the network node (SMS firewall) to the subscriber.

By leveraging the existing SMS specification and infrastructure and the SIM in the subscriber's device, the proposed solution may be widely supported on all mobile phones, including feature phones, with no requirement for the use of smartphones, smartphone applications or internet access. Where the method is implemented on the SMS firewall, no new network node deployment is required in the MNO network in order to support the secure A2P SMS service. Rather, the capabilities of the existing SMS firewall may be enhanced in order to provide the required functionality and the existing SMS OTA mechanism, for example using an OTA gateway/server in the MNO, may be used to manage SIM operations and updates and to deliver the PSKs to the SIM. If any fraudster intercepts the secured A2P SMS that is being delivered by the mobile network to the mobile subscriber, the intercepted SMS payload will be encrypted and so cannot be deciphered since the cryptographic keys are not transmitted with the SMS. The fraudster will, therefore, not be able to access the secure information such as OTP or other 2FA information contained in the encrypted SMS, and will not be able to complete an unauthorised transaction. Thus, even in the event of SMS interception, subscribers are protected from fraud.

Delivering the at least one pre-shared key and the encryption algorithm to the SIM using the SMS OTA mechanism may comprise:

- generating the at least one PSK for the subscriber;
- provisioning a SIM Toolkit, STK, application for the subscriber with the at least one PSK and the encryption algorithm; and
- delivering the STK application including the at least one PSK and the encryption algorithm to the SIM using the SMS OTA mechanism.

The at least one PSK may be unique to the subscriber.

Delivering the STK application to the SIM may comprise:

- delivering the STK application to a MNO OTA gateway associated with the subscriber for relaying to the SIM using the SMS OTA mechanism.

This may be done by routing an SMS command packet with ciphering enabled based on one or more SIM keys via the MNO OTA gateway The STK application may be an applet.

An advantage of this arrangement is that the PSKs may be generated and assigned by a network node, such as the SMS firewall, during an initial subscriber on-boarding process and provisioned to the subscriber's STK application securely via the existing SMS OTA infrastructure. This removes any requirement to send cryptographic keys with the encrypted A2P SMS, thereby mitigating any risk associated with interception of the encrypted A2P SMS and removing a potential vulnerability of existing systems. Delivery of the STK application or applet to the SIM via the SMS OTA mechanism benefits from the security associated with the OTA standards.

Alternatively, the at least one PSK and the encryption algorithm may be securely provided to the SIM by provisioning the at least one PSK and the encryption algorithm directly onto the SIM prior to delivery of the SIM to the subscriber. An STK application including the at least one PSK and the encryption algorithm may be provisioned directly onto the SIM. In this embodiment, the method may further comprise receiving details of the at least one PSK and the encryption algorithm at the network node upon activation of the SIM, for example, by receiving an indication of the at least one PSK and the encryption algorithm at the network node upon activation of the SIM, prior to receiving the A2P SMS from the A2P sender for delivery to the subscriber. This arrangement also has the advantage of avoiding any requirement to send cryptographic keys with the encrypted A2P SMS.

Relaying the encrypted A2P SMS payload to the SIM may comprise relaying the encrypted A2P SMS to a subscriber device in which the SIM is located, for example via a MNO core network, for delivery to the STK application on the SIM.

Determining that the A2P SMS requires secure A2P SMS delivery to the subscriber may comprise:

- determining that the A2P SMS includes a pre-defined tag indicating that the A2P SMS requires secure A2P SMS delivery to the subscriber; or
- determining that the A2P SMS requires secure A2P SMS delivery to the subscriber based on an identity of an A2P sender from which the A2P SMS is received.

An advantage of using a pre-defined tag is that it allows only specific A2P SMS that require secure delivery to be encrypted in accordance with the present invention. The tag may be applied by the A2P sender or by an aggregator. The pre-defined tag may be provided in an SMS Protocol ID (PID) field of the A2P SMS received from the SMS sender. The A2P sender may set this field in the A2P SMS to a previously unused, reserved value (as described in 3GPP 23.040) to indicate that the SMS is to be delivered securely to the subscriber.

Alternatively, or additionally, secured delivery may be applied to A2P SMS based on SMS payload content, for example, where the SMS contains a specific keyword.

Alternatively, or additionally, determining that the A2P SMS requires secure A2P SMS delivery to the subscriber may comprise determining that the subscriber is provisioned for secure A2P SMS service and/or determining that SMS encryption is enabled for all incoming A2P SMS based on a specific subscriber type, such as a post-paid subscriber type.

Multiple encryption algorithms may be supported by the SMS firewall or other network node. Examples of encryption algorithms that may be supported include Advanced Encryption Standard (AES) and Triple Data Encryption Standard (3DES). Alternatively, or additionally, other algorithms may be supported. Where multiple encryption algorithms are supported, each encryption algorithm may be securely provided to the SIM, for example, by delivering the multiple encryption algorithms to the SIM using the SMS OTA mechanism. This may be done by provisioning the STK application for the subscriber with each of the encryption algorithms prior to delivering the STK application to the SIM. The method may further comprise selecting the encryption algorithm for encrypting the payload of the A2P SMS. The selection may be based on a level of security required. The level of security required may be determined based on an identity of the subscriber, a sender address of the A2P SMS, message characteristics such as message length, content or keyword. This allows more secure algorithms to be selected for applications such as banking, whereas a lower security level may be applied to messaging or streaming applications. An advantage of this arrangement is that various levels of security may be available, depending on the subscriber's requirements or the nature of the A2P SMS. These may subsequently enhance security by providing added protection and complexity.

Encoding the encrypted A2P SMS payload may comprise encoding the A2P SMS payload based on one or more of: an SMS message length, an SMS encoding type, an index of the at least one PSK, an index of the encryption algorithm used to encrypt the A2P SMS payload, and the encrypted A2P SMS payload. Encoding the encrypted A2P SMS payload may comprise applying a header to the encrypted A2P SMS, wherein the header may include one or more of an index of the at least one PSK, an index of the encryption algorithm used to encrypt the A2P SMS payload, an SMS message length, and an SMS encoding type.

According to an aspect of the invention, there is provided a method for secure A2P SMS communication at a subscriber device comprising a SIM associated with a subscriber, comprising:

securely obtaining, at the SIM, at least one PSK and an encryption algorithm;

receiving an encoded A2P SMS payload from a network node, such as an SMS firewall, wherein the encoded A2P SMS payload is encrypted with the at least one PSK and the encryption algorithm;

decoding, at the SIM, the A2P SMS payload to obtain the encrypted A2P SMS payload;

decrypting, at the SIM, the encrypted A2P SMS payload using the at least one PSK and the encryption algorithm;

rendering and displaying the decrypted A2P SMS payload.

The subscriber device may comprise a SIM card removably inserted therein, such as a traditional physical SIM. However, the present disclosure is equally applicable to a SIM which is permanently integrated into the subscriber device, such as an eSIM or iSIM, and the term SIM as used herein is also intended to encompass such technologies.

Securely obtaining the at least one PSK and the encryption algorithm may comprise receiving the at least one PSK and the encryption algorithm from a network node, such as the SMS firewall, via a secured SMS OTA mechanism. This may take place, for example, during an onboarding process.

As set out above, the SMS OTA mechanism may be used to deliver the at least one PSK and the encryption algorithm to the SIM, using a command packet with ciphering enabled based on one or more SIM keys. Thus, the at least one PSK and the encryption code may be received from the network node, via the MNO OTA gateway.

Receiving the encoded A2P SMS payload from the network node may comprise receiving an SMS command packet without ciphering enabled. Because ciphering is not enabled, the SIM keys are not used and so the SMS command packet does not need to be routed via the MNO OTA gateway. Rather the at least one PSK and encryption algorithm are used for encryption in place of the SIM keys and so the mechanism for relaying the A2P SMS to the SIM is independent of the MNO OTA gateway. The SMS command packet may be received directly from the network node, such as the SMS firewall, or via a Short Message Service Centre (SMSC).

Receiving the at least one PSK and the encryption algorithm from the network node may comprise:

receiving an STK application including the at least one PSK and the encryption code via the SMS OTA mechanism; and securely installing the STK application on the SIM.

Receiving the STK application may comprise:

receiving the STK application from a MNO OTA gateway associated with the subscriber using the SMS OTA mechanism.

Alternatively, the at least one PSK and the encryption algorithm may be securely obtained by the SIM by provisioning the at least one PSK and the encryption algorithm directly onto the SIM prior to delivery of the SIM to the subscriber. An STK application including the at least one PSK and the encryption algorithm may be provisioned directly onto the SIM. In this embodiment, the method may further comprise providing details of the at least one PSK and the encryption algorithm to the network node upon activation of the SIM, for example, by providing an indication of the at least one PSK and the encryption algorithm to the network node upon activation of the SIM.

Decoding the A2P SMS payload to obtain the encrypted A2P SMS payload may comprise extracting an index of the at least one PSK and/or an index of the encryption algorithm used to encrypt the A2P SMS payload from a header of the encoded A2P SMS payload.

Decrypting the encrypted A2P SMS payload may comprise decrypting the A2P SMS payload by the STK application using the at least one pre-shared key and the encryption algorithm. The at least one PSK to be used for decryption may be determined based on the index of the at least one PSK extracted from the header of the encoded A2P SMS payload. The encryption algorithm to be used for decryption may be determined based on the index of the encryption algorithm extracted from the header of the encoded A2P SMS payload.

Multiple encryption algorithms may be supported by the subscriber device. Where multiple encryption algorithms are supported, each encryption algorithm may be securely received by the SIM, for example, from the network node using the SMS OTA mechanism, or provisioned onto the SIM prior to delivery of the SIM to the subscriber. The STK application received from the network node or provisioned directly to the SIM may include each of the supported encryption algorithms. The method may further comprise selecting the encryption algorithm for decrypting the encrypted A2P SMS payload. The selection may be based on an index extracted from a header applied to the encrypted A2P SMS payload, for example, during the decoding step.

According to an aspect of the invention, there is provided an apparatus for secure Application-to-Person (A2P) short messaging service (SMS) communication, comprising:

means for receiving an A2P SMS from an A2P sender for delivery to a subscriber;

means for determining that the A2P SMS requires secure A2P SMS delivery to the subscriber;

means for encrypting a payload of the A2P SMS using at least one at least one pre-shared key and an encryption algorithm, wherein the at least one PSK and the encryption algorithm have been securely provided to a SIM associated with the subscriber;

means for encoding the encrypted A2P SMS payload to obtain an encoded A2P SMS payload; and means for relaying the encoded A2P SMS payload to the SIM.

According to an aspect of the invention, there is provide an apparatus for secure Application-to-Person (A2P) short messaging service (SMS) communication, the apparatus comprising a Subscriber Identity Module (SIM) associated with a subscriber, comprising:

means for securely obtaining, at the SIM, at least one pre-shared key and an encryption algorithm;

means for receiving an encoded A2P SMS payload from a network node, wherein the encoded A2P SMS payload is encrypted with the at least one pre-shared key and the encryption algorithm;

means for decoding, at the SIM, the A2P SMS payload to obtain the encrypted A2P SMS payload;

means for decrypting, at the SIM, the encrypted A2P SMS payload using the at least one pre-shared key and the encryption algorithm; and means for rendering and displaying the decrypted A2P SMS payload.

According to an aspect of the invention, there is provided a network node for secure Application-to-Person, A2P, short messaging service (SMS) communication, comprising:

a memory; and at least one processor operatively coupled to the memory and configured to:

receive an A2P SMS from an A2P sender for delivery to a subscriber;

determine that the A2P SMS requires secure A2P SMS delivery to the subscriber;

encrypt a payload of the A2P SMS using at least one at least one pre-shared key and an encryption algorithm, wherein the at least one PSK and the encryption algorithm have been securely provided to a SIM associated with the subscriber;

encode the encrypted A2P SMS payload to obtain an encoded A2P SMS payload; and relay the encoded A2P SMS payload to the SIM.

According to an aspect of the invention, there is provided a subscriber device, comprising a Subscriber Identity Module (SIM) associated with a subscriber, for secure Application-to-Person (A2P) short messaging service (SMS) communication, the device comprising:

a memory; and at least one processor operatively coupled to the memory and configured to securely obtain, at the SIM, at least one pre-shared key and an encryption algorithm;

receive an encoded A2P SMS payload from a network node, wherein the encoded A2P SMS payload is encrypted with the at least one pre-shared key and the encryption algorithm;

decode, at the SIM, the A2P SMS payload to obtain the encrypted A2P SMS payload;

decrypt, at the SIM, the encrypted A2P SMS payload using the at least one pre-shared key and the encryption algorithm; and render and display the decrypted A2P SMS payload.

According to an aspect of the present invention, there is provided a method for secure A2P SMS communication at a network node, comprising:

delivering at least one pre-shared key (PSK) and an encryption algorithm to a SIM associated with a subscriber using a secured SMS Over-the-Air (OTA) mechanism;

receiving an A2P SMS from an A2P sender for delivery to the subscriber;

determining that the A2P SMS requires secure A2P SMS delivery to the subscriber;

encrypting a payload of the A2P SMS using at the at least one pre-shared key and the encryption algorithm;

encoding the encrypted A2P SMS payload to obtain an encoded A2P SMS payload;

relaying the encoded A2P SMS payload to the SIM.

According to an aspect of the present invention, there is provided a method for secure A2P SMS communication at a subscriber device comprising a SIM associated with a subscriber, comprising:

receiving at least one pre-shared key (PSK) and an encryption algorithm associated with the subscriber from a network node, such as an SMS firewall, via a secured SMS OTA mechanism;

receiving an encoded A2P SMS payload from the network node, such as the SMS firewall, for delivery to the subscriber, wherein the encoded A2P SMS payload is encrypted with the at least one PSK and the encryption algorithm;

decoding the A2P SMS payload to obtain the encrypted A2P SMS payload;

decrypting the encrypted A2P SMS payload using the at least one PSK and the encryption algorithm;

rendering and displaying the decrypted A2P SMS payload.

DETAILED DESCRIPTION OF THE DRAWINGS

Figure 1:
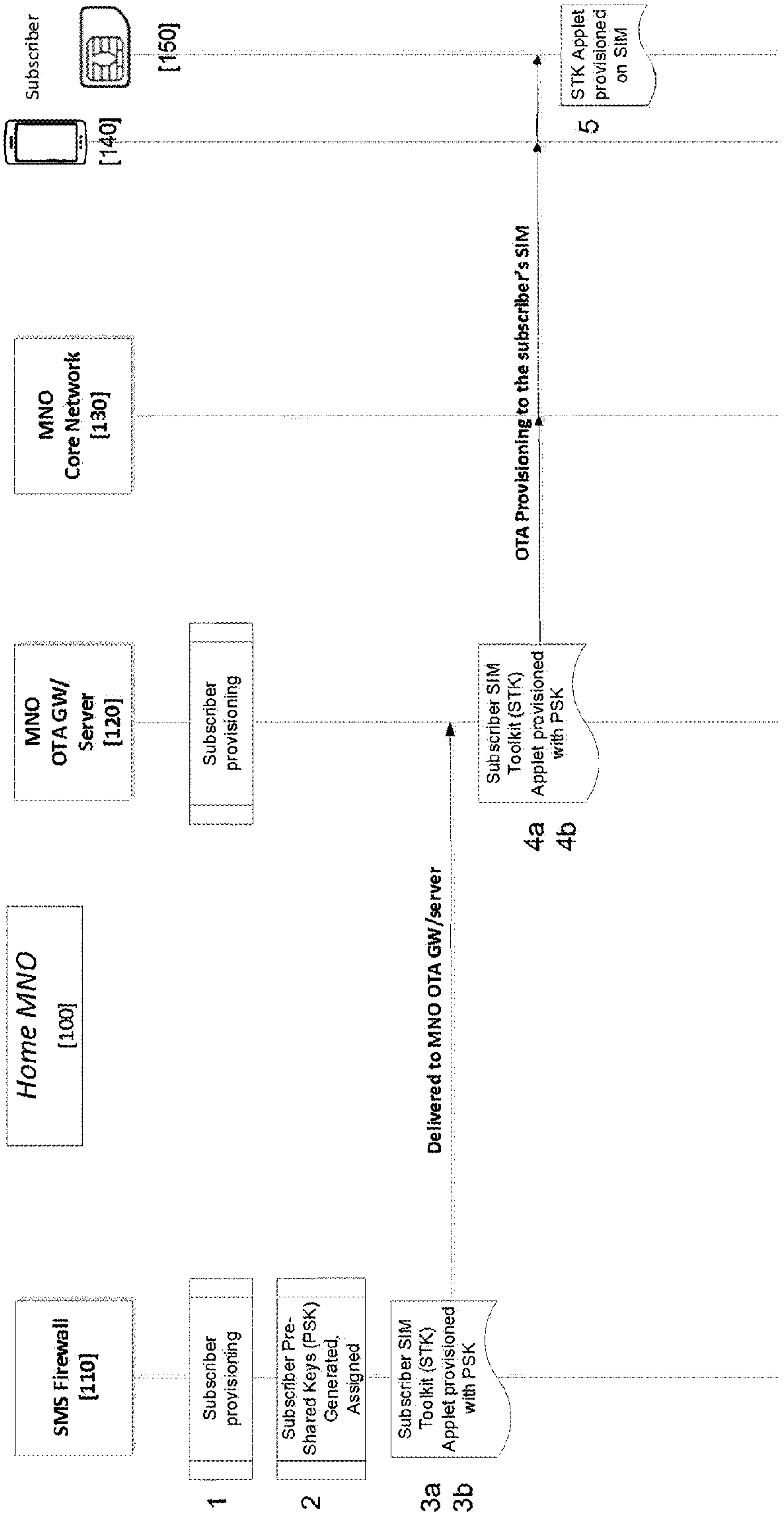
FIG. 1 is a flow diagram illustrating an on-boarding process according to an embodiment of the present invention.

Referring to FIG. 1, there is illustrated an on-boarding process for provisioning a subscriber for a secured A2P SMS service, according to an embodiment of the invention. A home Mobile Network Operator network 100 with which the subscriber is associated includes an SMS firewall 110, a MNO OTA gateway 120 and a MNO core network 130. A subscriber device 140 comprises a SIM 150 issued by the MNO and associated with the subscriber. Prior to the on-boarding process shown in FIG. 1, the a SIM profile for the subscriber will already have been provisioned on the MNO OTA gateway 120, in accordance with existing MNO procedures. The SMS firewall 110 will also be pre-provisioned with details of A2P senders that require secured A2P SMS delivery. The one-time on-boarding process may be carried out when a provisioned subscriber opts in to the secured A2P SMS service. Because the on-boarding process is carried out using the existing SMS OTA mechanism, the process is seamless for the subscriber.

In the embodiment shown in FIG. 1, in step 1, the subscriber is provisioned for the secured A2P SMS service on the SMS firewall 110. The MNO provides the SMS firewall 110 with the subscriber's details, such as mobile number (MSISDN) and active SIM (IMSI), for example, through a provisioning integration between the MNO and the SMS firewall. Next, the SMS firewall delivers one or more PSKs and an encryption algorithm to the SIM 150 using a secured SMS OTA mechanism. This is done by generating the one or more PSKs at the SMS firewall and assigning them to the subscriber at step 2. These PSKs are unique to the subscriber and securely stored at the SMS firewall. Next, at step 3*a*, the SMS firewall provisions a SIM Toolkit applet for the subscriber with the assigned PSKs and the encryption algorithm, so that the subscriber's PSKs are stored securely within the STK applet.

The SMS firewall 110 then delivers the STK applet including the PSKs to the subscriber's SIM using the secured SMS OTA mechanism. This is done by first delivering the STK applet from the SMS firewall to the MNO OTA gateway 120, at step 3*b*. At step 4*a*, the MNO OTA gateway 120 then packages the subscriber's STK applet for OTA provisioning based on the provisioned subscriber's SIM profile. The OTA provisioning may be specific to the subscriber's SIM security information.

At step 4*b*, the MNO OTA gateway provisions the subscriber's STK applet, including the assigned PSKs, via the secured SMS OTA mechanism over the MNO core network 130 onto the subscriber's SIM 150. At step 5, the subscriber's SIM receives the OTA provisioning request from the MNO OTA gateway 130 and securely provisions and installs the STK applet, including the assigned PSKs, on the SIM.

An alternative on-boarding procedure to that shown in FIG. 1 is as follows. The STK applet and PSKs may be pre-assigned based on the SIM details (IMSI, ICCID) by a secure A2P service provider. The STK applet and PSKs may then be provisioned directly onto the SIM by a SIM vendor. When the MNO assigns the mobile number (MSISDN) to the SIM, this information is then shared with the A2P service provider and the SMS firewall. When a subscriber activates the SIM, this information is also shared with the A2P service provider and the SMS firewall. Depending on the agreement with the MNO, the secure A2P SMS service may be pre-provisioned for such subscribers and SIMs. In this case the MNO OTA gateway is not used to provision the STK applet or PSKs on the SIM. After the SIM has been activated, the MNO may use to the OTA gateway to manage and update the SIM as required. If the subscriber changes to a new SIM that has been pre-provisioned by the SIM vendor, the updated SIM details (IMSI, ICCID) may then be shared by the MNO with the secure A2P service provider and the SMS firewall, assuming the same MSISDN is maintained.

Some or all of the steps shown in FIG. 1 may be repeated for the same subscriber when an update is requested, for example, where a subscriber is issued with a new or replacement SIM 150, or to reissue new PSKs if required, for example, where security concerns arise due to a potential hack or breach, regulatory issues or a subscriber complaint.

Figure 2:
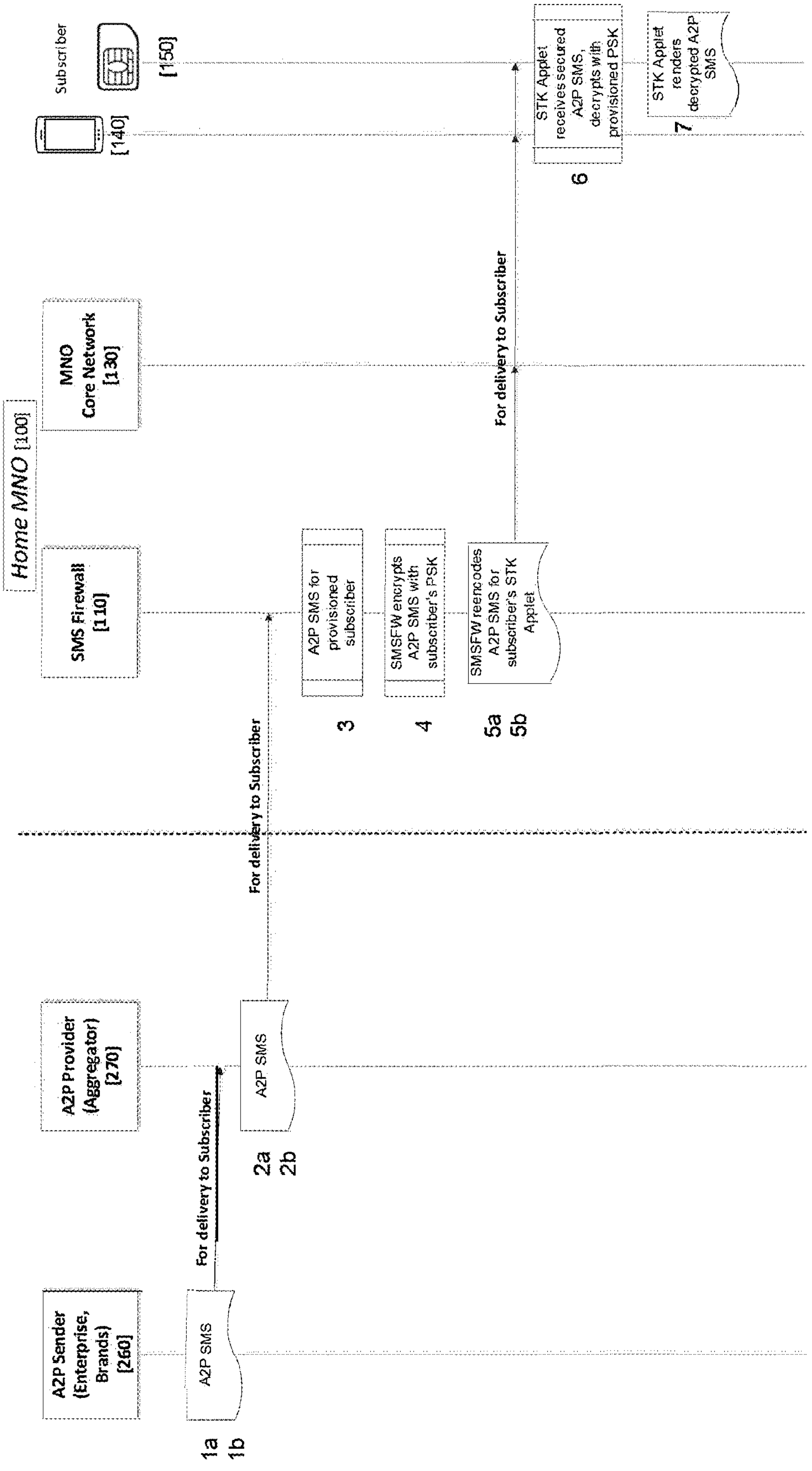
FIG. 2 is a flow diagram illustrating a process for handling secured A2P SMS delivery, according to an embodiment of the present invention.

Once the subscriber has been provisioned for the secured A2P SMS service as set out above, the SMS firewall may execute the secured A2P SMS service for A2P SMS messages intended for the provisioned subscriber. FIG. 2 illustrates a process flow for secured A2P SMS delivery, according to an embodiment of the invention.

At step 1*a*, an A2P sender 260, such as an enterprise or brand, generates an A2P SMS for delivery to the subscriber. The A2P SMS may contain a one-time-password (OTP) or be part of a two-factor-authentication (2FA) procedure for a banking transaction or other transaction where secured SMS delivery is required. In the present embodiment, the A2P sender indicates that the A2P SMS requires secure delivery to the subscriber by embedding a pre-defined tag in the A2P SMS. At step 1*b*, the A2P sender 260 submits the A2P SMS to an appointed A2P service provider or aggregator 270 for delivery to the subscriber.

At step 2*a*, the A2P service provider receives the A2P SMS from the A2P sender and at step 2*b*, the A2P service provider aggregates the A2P SMS with other A2P SMS traffic from other A2P senders and routes the A2P SMS towards the subscriber's MNO network 100 via a supported delivery channel. Such delivery channels will be established between the A2P service provider and the MNO and may be over private leased lines, VPNs, Internet or telco carrier signalling, as supported by both connecting parties.

The SMS firewall 110 acts as a service gateway node (that is, the point of ingress to the MNO network 100) for A2P SMS from external sources over the supported delivery channel and thus receives the A2P SMS generated by the A2P sender 260 from the A2P service provider 270. At step 3, the SMS firewall determines whether the A2P SMS requires secure A2P SMS delivery to the subscriber. In the present embodiment, the SMS firewall determines whether secure A2P SMS delivery is required by checking the received A2P SMS for the pre-defined tag embedded in the A2P SMS. In other embodiments, the determination may be automatically determined by the SMS firewall, for example, based on an identity of the A2P sender 260 from which the A2P SMS is received, or based on SMS payload content. The SMS firewall may also determine whether the subscriber has been provisioned for secure A2P SMS service.

If the A2P SMS is determined to require secure A2P SMS delivery to the subscriber and the subscriber has been provisioned for secure A2P SMS service, at step 4, the SMS firewall extracts an SMS payload from the received A2P SMS and encrypts the SMS payload using the subscriber's PSKs and an assigned encryption algorithm. Next, at step 5*a*, the SMS firewall re-encodes the encrypted SMS payload for delivery to the subscriber's STK applet, based on the OTA provisioning principles.

The encrypted A2P SMS payload is then relayed to the subscriber's SIM. This is done by relaying the encrypted A2P SMS to the MNO core network 130 for delivery to the subscriber, at step 5*b*. The encoded A2P SMS is delivered to the subscriber's SIM using an SMS command packet without ciphering enabled. Because ciphering is not enabled, the SIM keys are not used and so the SMS command packet does not need to be routed via the MNO OTA gateway. The MNO OTA gateway is not required to deliver the A2P SMS to the subscriber and so no adaptation of the MNO OTA gateway is required to support the present invention. At step 6, the subscriber's device 140 receives the encrypted A2P SMS and relays it to the STK applet on the SIM 150 for processing. The STK applet decodes and decrypts the SMS payload using the PSKs provisioned to the STK applet. At step 7, the STK applet then renders and displays the decrypted A2P SMS payload on the subscriber's device 140 to the subscriber.

Figure 3:
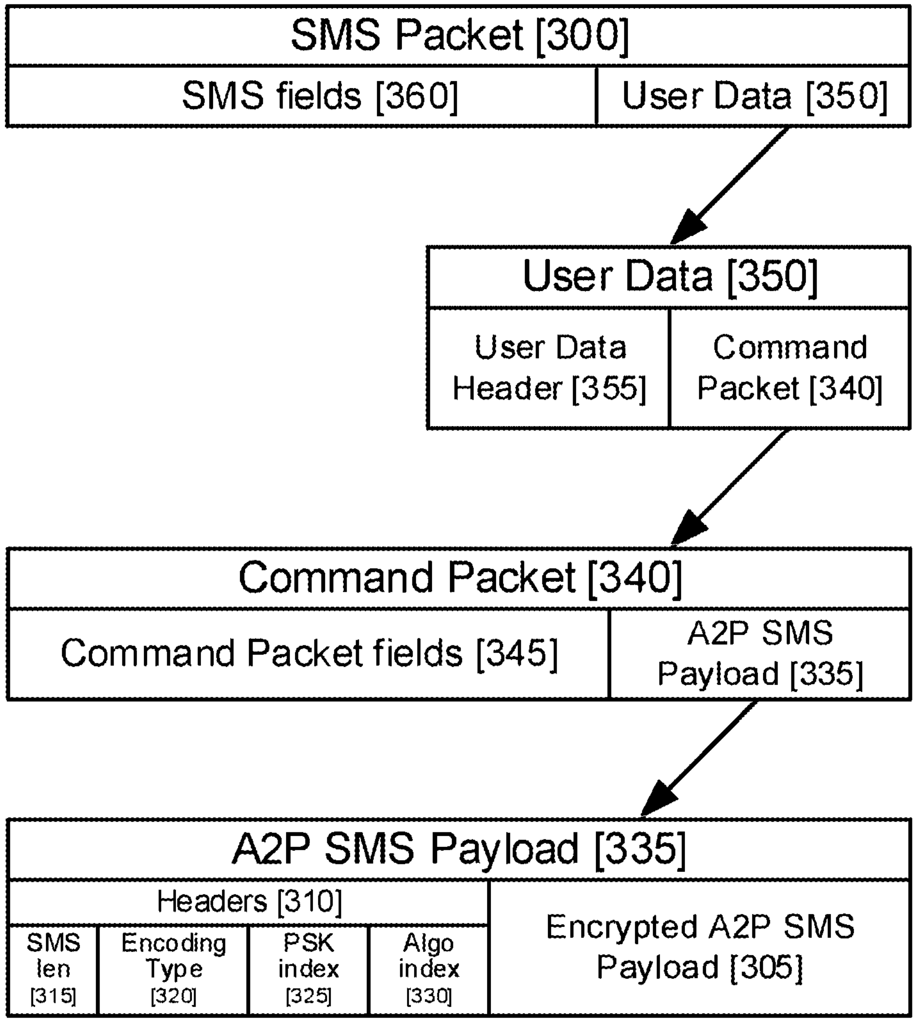
FIG. 3 illustrates an example SMS packet that may be used to relay an encrypted A2P SMS payload from a network node to a subscriber, in accordance with the invention.

FIG. 3 illustrates an example SMS packet 300 that may be used to relay an encrypted A2P SMS payload 305 from a network node to a subscriber, in accordance with the invention. A header 310 is applied to the encrypted A2P SMS payload during an encoding step to form an encoded A2P SMS payload 335. In the example shown, the header includes four fields: an SMS length field 315, and encoding type field 320, a PSK index field 325 and an algorithm index field 330. In other embodiments, fewer or additional fields may be present in the header. A value of the PSK index field 325 may indicate an index of the PSK used to encrypt the encrypted A2P SMS payload 305. For example, a first value may indicate that PSK1 was used to encrypt the A2P SMS payload, a second value may indicate that PSK2 was used to encrypt the A2P SMS payload, etc. A value of the algorithm index field 330 may indicate an index of the algorithm used to encrypt the A2P SMS payload. For example, a first value may indicate that an AES algorithm was used to encrypt the A2P SMS payload and a second value may indicate that a 3DES algorithm was used. As the at least one PSK and encryption algorithms have been provided to the SIM in advance, these indexes may be used by the SIM at the subscriber device to decrypt the A2P SMS payload. A value of the SMS length field 315 may indicate a length of the original A2P SMS. A value of the encoding type field 320 may indicate the type of encoding of the original A2P SMS. For example, a first value may indicate that 7-bit encoding is used, a second value may indicate that 8-bit encoding is used and a third value may indicate that 16-bit encoding is used. The encoded A2P SMS payload 335 is then included in a command packet 340 with command packet fields 345, in accordance with 3GPP standards and as described above. The command packet 340 is included in a user data packet 350 with a user data header 355, in accordance with 3GPP standards. SMS fields 360 are then applied with the user data 350 in accordance with 3GPP standards, to obtain the SMS packet 300 which may be relayed to the subscriber device.

Figure 4:
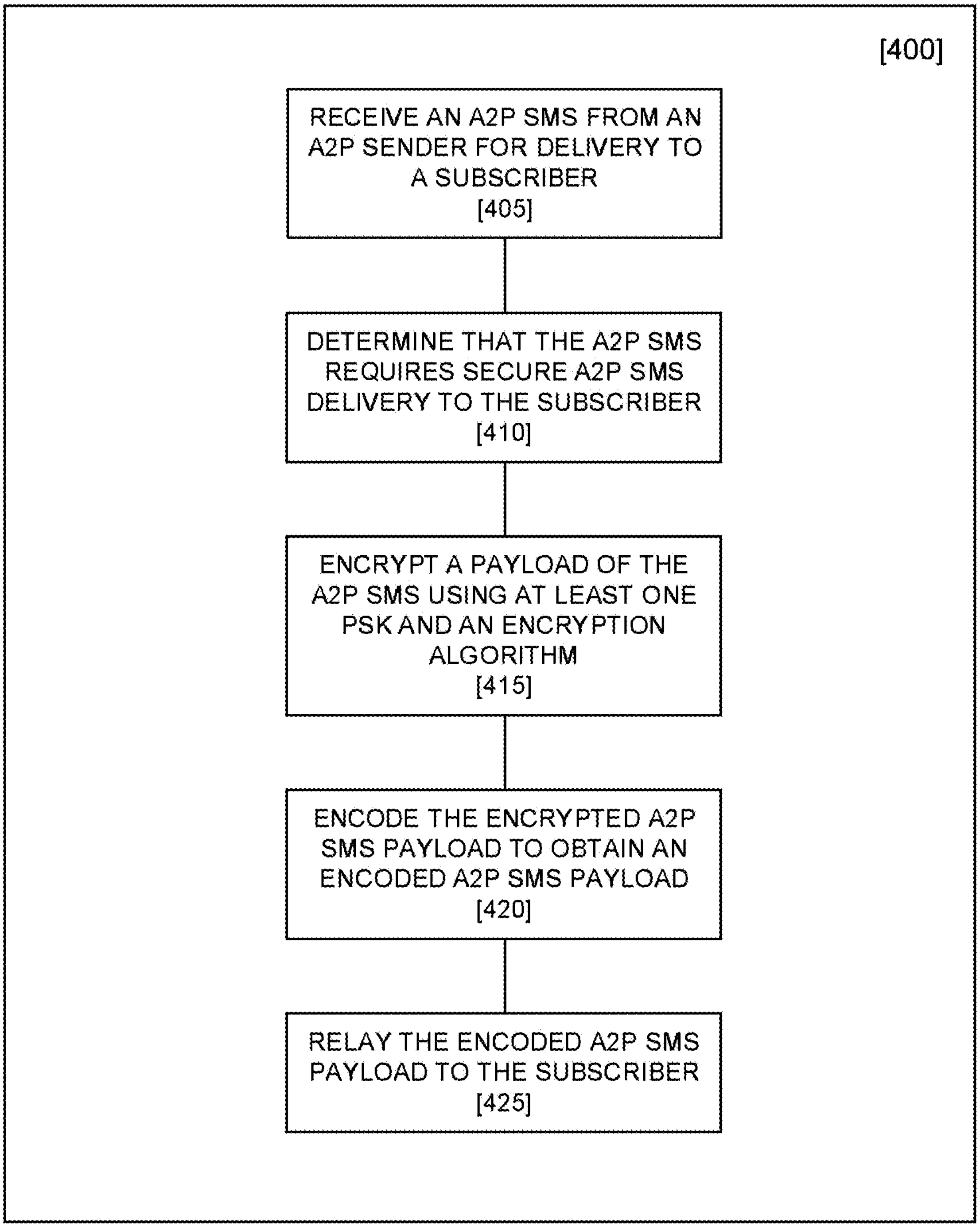
FIG. 4 is a flow diagram illustrating example operations for secure A2P SMS communication by a network node, in accordance with the invention.

FIG. 4 illustrates example operations 400 for secure A2P SMS communication by a network node, such as the SMS firewall 110, in accordance with the present invention. Operations 400 may be implemented as software components that are executed and run on one or more processors.

Operations 400 begin at 405 by receiving an A2P SMS from an A2P sender for delivery to a subscriber. For example, the A2P SMS may contain a one-time-password or be part of a two-factor-authentication procedure for a banking transaction or other transaction where secured SMS delivery is required. The A2P sender may indicate that the A2P SMS requires secure delivery to the subscriber by embedding a pre-defined tag in the A2P SMS.

At 410, the network node determines that the A2P SMS requires secure A2P SMS delivery to the subscriber. The network node may determine whether secure A2P SMS delivery is required by checking the received A2P SMS for the pre-defined tag embedded in the A2P SMS. Alternatively, the determination may be automatically determined by the network node, for example, based on an identity of the A2P sender from which the A2P SMS is received, or based on SMS payload content.

At 415, the network node encrypts a payload of the A2P SMS using at least one PSK and an encryption algorithm, wherein the at least one PSK and the encryption algorithm have been securely provided to a SIM associated with the subscriber. The network node may extract an SMS payload from the received A2P SMS and encrypt the SMS payload using the subscriber's PSK and an assigned encryption algorithm. The at least one PSK and the encryption algorithm may have been securely provided to the SIM associated with the subscriber, prior to receiving the A2P SMS from the A2P sender for delivery to the subscriber, for example, during an onboarding process. The at least one PSK and the encryption algorithm may have been delivered to the SIM associated with the subscriber using a secured SMS OTA mechanism.

At 420, the network node encodes the encrypted A2P SMS payload to obtain an encoded A2P SMS payload. Encoding the encrypted A2P SMS may comprise applying a header to the encrypted A2P SMS, wherein the header may include an index of the at least one PSK and/or an index of the encryption algorithm used to encrypt the A2P SMS payload At 425, the network node relays the encoded A2P SMS payload to the SIM. The network node may relay the encrypted A2P SMS to an MNO core network for delivery to the subscriber. The encoded A2P SMS may be delivered to the subscriber's SIM using an SMS command packet without ciphering enabled. Because ciphering is not enabled, the SIM keys are not used and so the SMS command packet does not need to be routed via the MNO OTA gateway.

Figure 5:
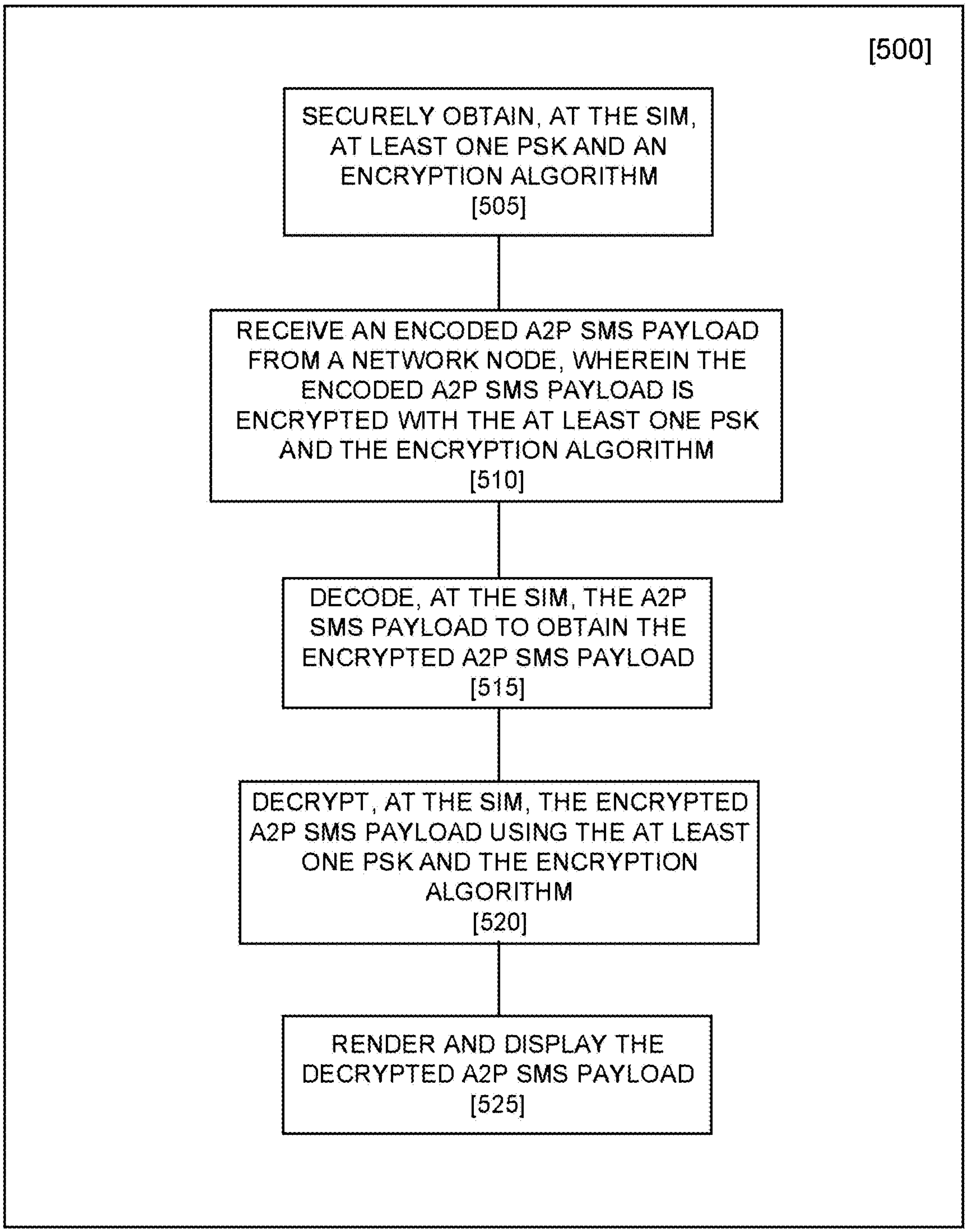
FIG. 5 is a flow diagram illustrating examples operations for secure A2P SMS communication by a subscriber device, in accordance with the invention.

FIG. 5 illustrates example operations 500 for secure A2P SMS communication by a subscriber device, such as the subscriber device 140 comprising a SIM 150 associated with the subscriber, in accordance with the present invention. Operations 500 may be implemented as software components that are executed and run on one or more processors.

Operations 500 begin at 505 by securely obtaining, at the SIM, at least one pre-shared key and an encryption algorithm. This may comprise receiving, from a network node, one or more PSKs and an encryption algorithm over a secured SMS OTA mechanism.

At 510, the subscriber device receives an encoded A2P SMS payload from a network node, wherein the encoded A2P SMS payload is encrypted with the at least one pre-shared key and the encryption algorithm. Receiving the encoded A2P SMS payload may comprise receiving an SMS command packet without ciphering enabled. Because ciphering is not enabled, the SIM keys are not used and so the SMS command packet does not need to be routed via the MNO OTA gateway. Rather the at least one PSK and encryption algorithm are used for encryption in place of the SIM keys. The SMS command packet may be received directly from the network node, such as the SMS firewall, or via a SMSC.

At 515, the subscriber device decodes the A2P SMS payload to obtain the encrypted A2P SMS payload. This step may be performed at the SIM, for example, by an STK application on the SIM. This step may involve extracting an index of the at least one PSK and/or an index of the encryption algorithm used to encrypt the A2P SMS payload from a header of the encoded A2P SMS payload.

At 520, the SIM in the subscriber device decrypts the encrypted A2P SMS payload using the at least one pre-shared key and the encryption algorithm. This step may be performed at the SIM, for example, by an STK application on the SIM. The at least one PSK to be used for decryption may be determined based on the index of the at least one PSK extracted from the header of the encoded A2P SMS payload. The encryption algorithm to be used for decryption may be determined based on the index of the encryption algorithm extracted from the header of the encoded A2P SMS payload.

At 525, the subscriber device renders and displays the decrypted A2P SMS payload to the subscriber. An STK application on the SIM may instruct the subscriber device to render and display the decrypted A2P SMS payload.

Figure 6:
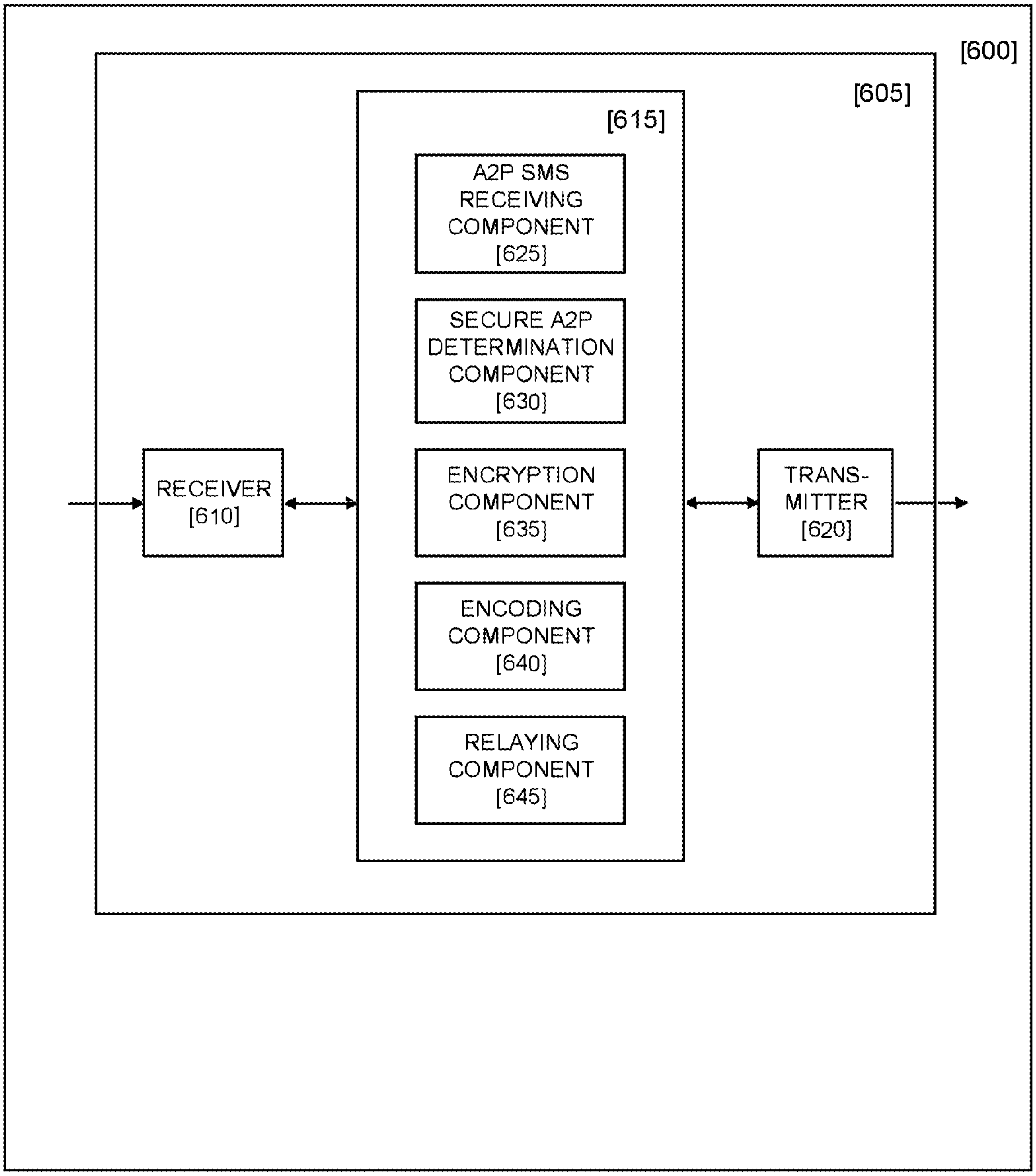
FIG. 6 is a block diagram of a network node that supports secure A2P SMS communication in accordance with the invention.

FIG. 6 is a block diagram 600 of a network node 605 that supports secure A2P SMS communication in accordance with aspects of the invention. Network node may include receiver 610, communications manager 615 and transmitter 620. Network node 605 may also include a processor. Each of these components may be in communication with one another.

Communications manager 615 may comprise A2P SMS receiving component 625, secure A2P determination component 630, encryption component 635, encoding component 640 and relaying component 645.

A2P SMS receiving component 625 may receive an A2P SMS from an A2P sender for delivery to a subscriber. Secure A2P determination component may determine that the A2P SMS requires secure A2P SMS delivery to the subscriber. Encryption component 635 may encrypt a payload of the A2P SMS using at least one PSK and an encryption algorithm, wherein the at least one PSK and the encryption algorithm have been securely provided to a Subscriber Identity Module, SIM, associated with the subscriber. Encoding component 640 may encode the encrypted A2P SMS payload to obtain an encoded A2P SMS payload. Relaying component 645 may relay the encoded A2P SMS payload to the SIM.

Figure 7:
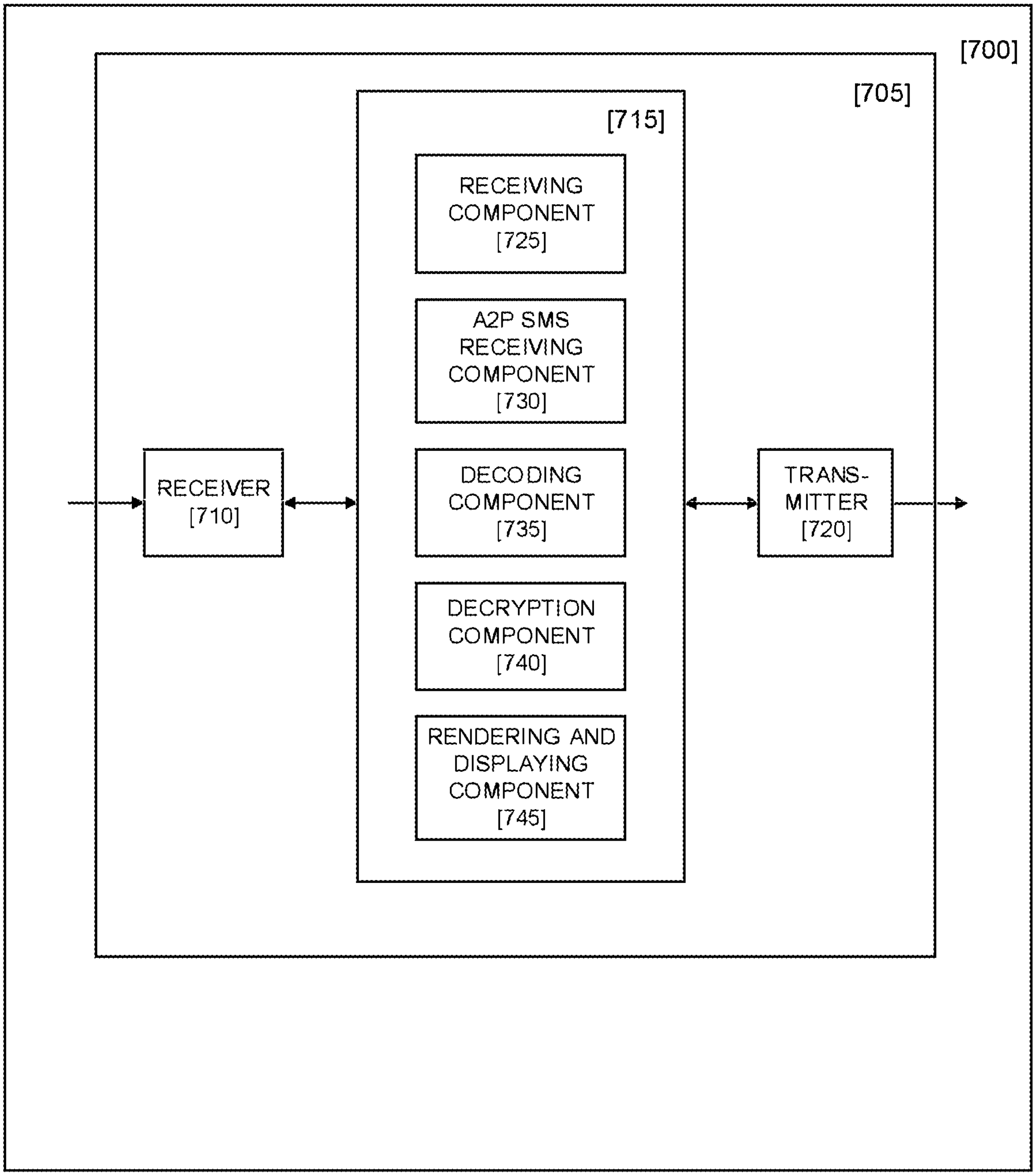
FIG. 7 is a block diagram of a subscriber device that supports secure A2P SMS communication in accordance with the invention.

FIG. 7 is a block diagram 700 of a subscriber device 705 that supports secure A2P SMS communication in accordance with aspects of the invention. Subscriber device 705 may include receiver 710, communications manager 715 and transmitter 720. Subscriber device 705 may also include a processor and a SIM. Each of these components may be in communication with one another.

Communications manager 715 may comprise receiving component 725, A2P SMS receiving component 730, decoding component 735, decryption component 740 and rendering and displaying component 745. Certain of these components may be provided at the SIM.

Receiving component 725 may be provided at the SIM and may securely receive, at the SIM, at least one pre-shared key and an encryption algorithm. A2P SMS receiving component may receive an encoded A2P SMS payload from a network node, wherein the encoded A2P SMS payload is encrypted with the at least one pre-shared key and the encryption algorithm. Decoding component 735 may be provided at the SIM and may decode the A2P SMS payload to obtain the encrypted A2P SMS payload. Decryption component 740 may be provided at the SIM and may decrypt the encrypted A2P SMS payload using the at least one pre-shared key and the encryption algorithm. Rendering and displaying component 745 may render and display the decrypted A2P SMS payload.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method for secure Application-to-Person (A2P) short messaging service (SMS) communication at a network node, comprising:

delivering each of (i) at least one pre-shared key (PSK) and (ii) an encryption algorithm to a Subscriber Identity Module (SIM) associated with a subscriber using a secured SMS Over-the-Air (OTA) mechanism using an SMS command packet with ciphering enabled based on one or more SIM keys;

receiving an A2P SMS from an A2P sender for delivery to the subscriber;

determining that the A2P SMS requires secure A2P SMS delivery to the subscriber;

encrypting a payload of the A2P SMS using the at least one PSK and the encryption algorithm;

encoding the encrypted A2P SMS payload to obtain an encoded A2P SMS payload; and relaying the encoded A2P SMS payload to the SIM using an SMS command packet without ciphering enabled.

2. The method of claim 1, wherein delivering each of (i) the at least one PSK and (ii) the encryption algorithm to the SIM comprises:

generating the at least one PSK for the subscriber;

provisioning a SIM Toolkit (STK) application for the subscriber with the at least one PSK and the encryption algorithm; and delivering the STK application including the at least one PSK and the encryption algorithm to the SIM using the secured SMS OTA mechanism.

3. The method of claim 2, wherein delivering the STK application to the SIM comprises:

delivering the STK application to a Mobile Network Operator (MNO) OTA gateway associated with the subscriber for relaying to the SIM using the SMS OTA mechanism.

4. The method of claim 1, wherein relaying the encoded A2P SMS payload to the SIM comprises:

relaying the encoded A2P SMS to a subscriber device in which the SIM is located for delivery to a SIM Toolkit (STK) application on the SIM.

5. The method of claim 1, wherein determining that the A2P SMS requires secure A2P SMS delivery to the subscriber comprises:

determining that the A2P SMS includes a pre-defined tag indicating that the A2P SMS requires secure A2P SMS delivery to the subscriber;

determining that the A2P SMS requires secure A2P SMS delivery to the subscriber based on an identity of an A2P sender from which the A2P SMS is received;

determining that the A2P SMS requires secure A2P SMS delivery to the subscriber based on a payload content of the A2P SMS; or determining that the A2P SMS requires secure delivery to the subscriber based on the subscriber being provisioned for secure A2P SMS service.

6. The method of claim 1, wherein a plurality of encryption algorithms have been securely provided to the SIM, the method further comprising:

selecting the encryption algorithm for encrypting the payload of the A2P SMS from the plurality of encryption algorithms.

7. The method of claim 1, wherein encoding the encrypted A2P SMS payload comprises:

encoding the encrypted A2P SMS payload based on one or more of an SMS message length, an SMS encoding type, an index of the at least one PSK, an index of the encryption algorithm used to encrypt the A2P SMS payload, and the encrypted A2P SMS payload.

8. The method of claim 1, wherein encoding the encrypted A2P SMS payload comprises:

applying a header to the encrypted A2P SMS, wherein the header includes an index of the at least one PSK and/or an index of the encryption algorithm used to encrypt the A2P SMS payload.

9. A method for secure Application-to-Person (A2P) short messaging service (SMS) communication at a subscriber device comprising a Subscriber Identity Module (SIM) associated with a subscriber, comprising:

receiving, at the SIM, each of (i) at least one pre-shared key (PSK) and (ii) an encryption algorithm, from a network node via a secured SMS Over-the-Air (OTA) mechanism using an SMS command packet with ciphering enabled based on one or more SIM keys;

receiving, using an SMS command packet without ciphering enabled, an encoded A2P SMS payload from the network node, wherein the encoded A2P SMS payload is encrypted with the at least one PSK and the encryption algorithm;

decoding, at the SIM, the A2P SMS payload to obtain the encrypted A2P SMS payload;

decrypting, at the SIM, the encrypted A2P SMS payload using the at least one PSK and the encryption algorithm; and rendering and displaying the decrypted A2P SMS payload.

10. The method of claim 9, wherein receiving the at least one PSK and the encryption algorithm from the network node comprises:

receiving a Subscriber Identity Module Toolkit (STK) application including the at least one PSK and the encryption algorithm via the SMS OTA mechanism; and securely installing the STK application on the SIM.

11. The method of claim 10, wherein receiving the STK application comprises:

receiving the STK application from a Mobile Network Operator (MNO) OTA gateway associated with the subscriber using the SMS OTA mechanism.

12. The method of claim 9, wherein decoding the A2P SMS payload to obtain the encrypted A2P SMS payload comprises:

extracting an index of the at least one PSK and/or an index of the encryption algorithm used to encrypt the A2P SMS payload from a header of the encoded A2P SMS payload.

13. A network node for secure Application-to-Person (A2P) short messaging service (SMS) communication, comprising:

a memory; and at least one processor operatively coupled to the memory and configured to:

deliver each of (i) at least one pre-shared key (PSK) and (ii) an encryption algorithm to a Subscriber Identity Module (SIM) associated with a subscriber using a secured SMS Over-the-Air (OTA) mechanism using an SMS command packet with ciphering enabled based on one or more SIM keys;

receive an A2P SMS from an A2P sender for delivery to the subscriber;

determine that the A2P SMS requires secure A2P SMS delivery to the subscriber;

encrypt a payload of the A2P SMS using the at least one PSK and the encryption algorithm;

encode the encrypted A2P SMS payload to obtain an encoded A2P SMS payload; and relay the encoded A2P SMS payload to the SIM using an SMS command packet without ciphering enabled.

14. The network node of claim 13, wherein delivering each of (i) the at least one PSK and (ii) the encryption algorithm to the SIM comprises:

generating the at least one PSK for the subscriber;

provisioning a SIM Toolkit (STK) application for the subscriber with the at least one PSK and the encryption algorithm; and delivering the STK application including the at least one PSK and the encryption algorithm to the SIM using the secured SMS OTA mechanism.

15. The network node of claim 14, wherein delivering the STK application to the SIM comprises:

delivering the STK application to a Mobile Network Operator (MNO) OTA gateway associated with the subscriber for relaying to the SIM using the SMS OTA mechanism.

16. The network node of claim 13, wherein relaying the encoded A2P SMS payload to the SIM comprises:

relaying the encoded A2P SMS to a subscriber device in which the SIM is located for delivery to a SIM Toolkit (STK) application on the SIM.

17. The network node of claim 13, wherein determining that the A2P SMS requires secure A2P SMS delivery to the subscriber comprises:

determining that the A2P SMS includes a pre-defined tag indicating that the A2P SMS requires secure A2P SMS delivery to the subscriber;

determining that the A2P SMS requires secure A2P SMS delivery to the subscriber based on an identity of an A2P sender from which the A2P SMS is received;

determining that the A2P SMS requires secure A2P SMS delivery to the subscriber based on a payload content of the A2P SMS; or determining that the A2P SMS requires secure delivery to the subscriber based on the subscriber being provisioned for secure A2P SMS service.

18. The network node of claim 13, wherein a plurality of encryption algorithms have been securely provided to the SIM, and wherein the at least one processor is further configured to:

select the encryption algorithm for encrypting the payload of the A2P SMS from the plurality of encryption algorithms.

19. The network node of claim 13, wherein encoding the encrypted A2P SMS payload comprises:

encoding the encrypted A2P SMS payload based on one or more of an SMS message length, an SMS encoding type, an index of the at least one PSK, an index of the encryption algorithm used to encrypt the A2P SMS payload, and the encrypted A2P SMS payload.

20. The network node of claim 13, wherein encoding the encrypted A2P SMS payload comprises:

applying a header to the encrypted A2P SMS, wherein the header includes an index of the at least one PSK and/or an index of the encryption algorithm used to encrypt the A2P SMS payload.

* * * * *